(12) United States Patent
Amon et al.

(10) Patent No.: US 8,033,101 B2
(45) Date of Patent: Oct. 11, 2011

(54) EXHAUST-GAS SYSTEM HAVING AN INJECTION NOZZLE

(75) Inventors: Bernd Amon, Bamberg (DE); Herbert Albert, Erlangen (DE)

(73) Assignee: Faurecia Abgastechnik GmbH, Fuerth (DE)

( * ) Notice: Subject to any disclaimer, the term of this patent is extended or adjusted under 35 U.S.C. 154(b) by 720 days.

(21) Appl. No.: 12/055,730

(22) Filed: Mar. 26, 2008

(65) Prior Publication Data
US 2008/0223022 A1 Sep. 18, 2008

Related U.S. Application Data

(63) Continuation of application No. PCT/EP2006/009352, filed on Sep. 26, 2006.

(30) Foreign Application Priority Data

Sep. 26, 2005 (DE) .......................... 10 2005 046 074
Jan. 25, 2006 (DE) .......................... 10 2006 003 786

(51) Int. Cl.
*F01N 3/00* (2006.01)

(52) U.S. Cl. ................ 60/286; 60/295; 60/301; 60/303; 60/324; 239/398; 239/399; 222/137; 222/145.6; 222/145.7

(58) Field of Classification Search ............ 60/286, 60/295, 301, 303, 324; 239/398, 399; 222/137, 222/145.5, 145.6, 145.7
See application file for complete search history.

(56) References Cited

U.S. PATENT DOCUMENTS

| 4,370,304 A | * | 1/1983 | Hendriks et al. ............. 422/224 |
| 5,570,576 A | * | 11/1996 | Ament et al. ................... 60/300 |
| 6,401,455 B1 | * | 6/2002 | Mathes et al. .................. 60/286 |
| 6,444,177 B1 | * | 9/2002 | Muller et al. .................. 422/177 |
| 7,181,906 B2 | * | 2/2007 | Dalla Betta et al. ............ 60/286 |
| 7,200,989 B2 | * | 4/2007 | Mayer et al. .................... 60/286 |
| 7,328,572 B2 | * | 2/2008 | McKinley et al. .............. 60/286 |
| 7,752,839 B2 | * | 7/2010 | Hirata et al. .................... 60/286 |
| 2007/0163241 A1 | | 7/2007 | Meingast et al. | |

FOREIGN PATENT DOCUMENTS

| DE | 42 30 056 A1 | 3/1994 |
| DE | 100 60 808 A1 | 7/2002 |
| DE | 101 42 804 A1 | 8/2002 |
| JP | 3-174223 A | 7/1991 |
| JP | 11-166410 A | 6/1999 |
| WO | 2005/073524 A1 | 8/2005 |

OTHER PUBLICATIONS

International Search Report, dated Jan. 12, 2007.

* cited by examiner

*Primary Examiner* — Binh Q Tran

(74) *Attorney, Agent, or Firm* — Laurence A. Greenberg; Werner H. Stemer; Ralph E. Locher

(57) ABSTRACT

An exhaust-gas system has an exhaust-gas pipe for guiding an exhaust-gas flow and an injection nozzle mounted to the exhaust-gas pipe for injecting reducing agent into the exhaust-gas flow. Downstream of the injection nozzle, the exhaust-gas pipe branches into at least two exhaust-gas lines. A fluid divider, formed with a front face that faces upstream into the gas flow, is disposed between the injection nozzle and the branching. The front face is oriented with respect to the cross section of the exhaust-gas pipe and the injection nozzle, such that the exhaust-gas flow and the medium are divided among the exhaust-gas lines in a predefined dividing ratio.

14 Claims, 5 Drawing Sheets

EXHAUST-GAS SYSTEM HAVING AN INJECTION NOZZLE

CROSS-REFERENCE TO RELATED APPLICATIONS

This is a continuation, under 35 U.S.C. §120, of copending International application PCT/EP2006/009352, filed Sep. 26, 2006, which designated the United States; this application also claims the priority, under 35 U.S.C. §119, of German patent applications DE 10 2005 046 074.7, filed Sep. 26, 2005 and DE 10 2006 003 786.3, filed Jan. 25, 2006; the prior applications are herewith incorporated by reference in their entirety.

BACKGROUND OF THE INVENTION

Field of the Invention

The invention relates to an exhaust-gas system comprising an exhaust-gas pipe for guiding an exhaust-gas flow and an injection nozzle arranged on the exhaust-gas pipe for injecting a reducing agent into the exhaust-gas flow and comprising a branching of the exhaust-gas pipe, arranged downstream of the injection nozzle, into at least two exhaust-gas lines, each comprising a separate SCR catalytic converter.

Complicated and expensive exhaust-gas systems, which guide in exhaust gases produced during operation of the internal combustion engine as an exhaust-gas flow and carry out post-treatment on the exhaust-gas flow, are currently arranged downstream of internal combustion engines, in particular in motor vehicles. The post-treatment is used, in this case, mainly for the greatest possible reduction in pollutants.

To this end, so-called SCR catalytic converters (SCR, selective catalytic conversion), among others, are installed in the exhaust-gas system, which primarily reduce nitrogen oxide contained in the exhaust gas.

For operating the catalytic converters, it is necessary to add a reducing agent, for example aqueous urea solution, to the exhaust-gas flow, upstream of the catalytic converter. An injection nozzle, for example, is provided for this purpose which is attached to the side of the exhaust-gas pipe which leads to the catalytic converter. The reducing agent in the form of an aqueous solution is injected by the injection nozzle into the exhaust-gas flow and is mixed with the exhaust gas. The exhaust-gas flow displaced in this manner by the reducing agent, then comes into contact with the SCR catalytic converter. In the case of aqueous urea solution, the water vaporizes in the hot exhaust gas and the urea is substantially broken down to form ammonia, which reacts in the SCR catalytic converter with the nitrogen oxides to form nitrogen and water.

Modern exhaust-gas systems are often constructed so that they are divided between the engine and the catalytic converter into a plurality of exhaust-gas lines. A separate catalytic converter is provided, therefore, in each exhaust-gas line. However, so that only one nozzle is required for injecting the reducing agent, the mixing of the exhaust-gas flow with the reducing agent takes place in the region of the exhaust-gas system which is still in one piece i.e. viewed in the flow direction of the exhaust gas, before the division of the exhaust-gas flow into two exhaust-gas lines. The problem occurs here that the differences in concentration and/or the degree of mixing of exhaust-gas and reducing agent after the division of the exhaust-gas flow, i.e. in the different exhaust-gas lines, are different. The object in this case is to achieve a distribution of the reducing agent into both exhaust-gas flows which is as uniform as possible.

BRIEF SUMMARY OF THE INVENTION

It is accordingly an object of the invention to provide an exhaust gas system, which overcomes the above-mentioned disadvantages of the heretofore-known devices and methods of this general type and which provides, in general, for an improved exhaust-gas system with an injection nozzle.

With the foregoing and other objects in view there is provided, in accordance with the invention, an exhaust-gas system, comprising:

an exhaust-gas pipe for guiding an exhaust-gas flow;

an injection nozzle mounted to said exhaust-gas pipe for injecting a reducing agent into the exhaust-gas flow, said injection nozzle being configured to inject the reducing agent into the exhaust gas flow in form of an atomizing cone;

an exhaust-gas pipe branching device downstream of said injection nozzle, dividing said exhaust-gas pipe into at least two exhaust-gas lines;

a separate SCR catalytic converter disposed in each one of said exhaust-gas lines;

a fluid divider disposed between said injection nozzle and said branching device, said fluid divider having a front face facing upstream into the exhaust-gas flow and intersecting a projection of said atomizing cone and a cross-sectional area of said exhaust gas pipe to divide the exhaust-gas flow and the reducing agent among said at least two exhaust-gas lines in a predefinable dividing ratio.

In other words, the objects of the invention are achieved in that a branching is located downstream of the injection nozzle. Here the exhaust-gas pipe branches into at least two separate partial lines and/or exhaust-gas lines, which respectively convey one portion of the exhaust-gas.

According to the invention, a fluid divider having a front face which faces upstream is arranged between the injection nozzle and the branching. As a dividing line and/or boundary between the exhaust-gas lines, the front face therefore controls the distribution thereto of the exhaust gas displaced by the medium. According to the invention, moreover, the front face is oriented in the exhaust-gas pipe such that the exhaust-gas flow and reducing agent are divided among the exhaust-gas lines in a predefinable and/or desired dividing ratio. The orientation of the front face, therefore, is understood to be the path thereof relative to the cross-section of the exhaust gas pipe in the region of the front face of the fluid divider.

During the spraying and/or injecting of the reducing agent, generally an atomizing cone is formed in the exhaust-gas flow. Relative to the cross-sectional area of the exhaust-gas pipe in the spraying region, the fluid divider is, therefore, arranged such that the upstream front face thereof intersects the projection of the atomizing cone on the cross-sectional area of the exhaust-gas pipe and thus divides and/or intersects the projection in the desired dividing ratio. The division of the spray in the desired dividing ratio is thus also carried out in this manner. Primarily in the case of two exhaust-gas lines, and a symmetrical atomizing cone, the projection area thereof may be easily divided, in order to achieve a uniform distribution of the medium in both exhaust-gas lines.

For distributing the reducing agent it follows that this is generally determined by the positioning and/or dimensioning of the injection nozzle relative to the front face. For dimensioning the exhaust-gas flow and the quantity of medium, therefore, the geometry of the exhaust-gas pipe, the fluid divider and the injection nozzle have to be adjusted relative to one another.

The dividing ratio may, therefore, be controlled by the structural arrangement of the fluid divider and/or the front face thereof upstream in the exhaust gas pipe. The variation of the arrangement of the front face is, therefore, for example a rotation, tilting, deformation or displacement of the front face relative to the cross section of the exhaust gas pipe. Any modification relative to the front face and/or the path thereof in the exhaust-gas pipe leads to a modified portion of injected reducing agent and, moreover, a modified portion of exhaust-gas being supplied to the respective exhaust-gas line, respectively depending on the location, direction and quantity injected. Thus, in every exhaust-gas line the portion of exhaust gas and reducing agent may be influenced relative to the total exhaust-gas flow and the total reducing agent and the desired dividing ratios set accordingly.

A separate SCR catalytic converter and/or partial catalytic converter is disposed in each of the exhaust-gas line after the division. Each of the catalytic converters carries out an individual exhaust-gas post-treatment.

The fluid divider and/or the front face thereof, may be arranged such that the medium is uniformly divided among the exhaust-gas lines. Each exhaust-gas line is thus supplied with the same quantity of reducing agent. This is, for example, expedient for symmetrical exhaust-gas lines, which respectively process the same quantities of exhaust gas in SCR catalytic converters of the same dimensions.

The front face may, therefore, contain one or more straight pieces. In this case, it is particularly easy to divide the projection area of the atomizing cone and/or to present the front face, for example, as a polygon and thus to determine easily the dividing ratio of the exhaust-gas and reducing agent. Particularly in the case of a straight front face, said front face may be formed as part of a single straight line. The straight line is thus able to extend so that it intersects the aforementioned projection of the atomizing cone in the desired dividing ratio, in a manner which forms identical areas.

The fluid divider may be configured two-dimensionally in the manner of a strip twisted along the longitudinal axis of the exhaust-gas pipe. The fluid divider thus comprises, for example in the case of two exhaust-gas lines, an upstream front face, a downstream front face and two lateral front faces. The upstream face is thus arranged in the exhaust-gas flow as the element determining the distribution thereof, as disclosed above. The downstream face is connected to the interface with the conveying exhaust-gas lines. The two lateral front faces bear against the internal wall of the exhaust-gas pipe. The fluid divider thus forms a twisted deflector plate dividing by its front face the exhaust-gas flow into two separate flows. Similarly, corresponding embodiments are easily conceivable for a plurality of exhaust-gas lines.

The upstream front face may be located in one plane with the direction of injection of the reducing agent and the central longitudinal axis of the exhaust-gas pipe. As the atomizing cone is generally configured symmetrically relative to its direction of injection as regards the cross-sectional area of the exhaust-gas pipe, then the spray, as mentioned above, is automatically divided among the exhaust-gas lines into two portions which are identical, by means of the front face of the fluid divider.

In known exhaust-gas systems, in particular those with a SCR catalytic converter, the problem also exists that the mixing of the reducing agent with the exhaust-gas flow is insufficient. If the inlet cross section of the exhaust-gas flow in the SCR catalytic converter is considered, the distribution of the concentration of the reducing agent in the exhaust-gas relative to this surface area is often not uniform, for example on the outer edge of the catalytic converter it is markedly smaller than in the center thereof. The filtering and/or cleaning effect of the catalytic converter is thus restricted, as exhaust gas and reducing agent do not flow through said catalytic converter uniformly. A distribution which is as uniform as possible of the concentration of the reducing agent over the entire cross-sectional area of the catalytic converter might be desirable in this case.

This may be achieved by fitting a swirl element in the exhaust gas pipe and thus the exhaust gas flow. A swirl element may, therefore, be arranged upstream of the injection nozzle. As a result of the swirl element, the exhaust-gas flow is swirled in a region downstream of the swirl element. Also, the injection nozzle and thus the region for injecting the reducing agent into the exhaust gas flow is located downstream of the swirl element. In other words, the reducing agent is introduced precisely into the swirled region of the exhaust gas flow, whereby the mixing together of the exhaust-gas flow with the reducing agent is markedly improved. The distribution of the concentration of the reducing agent via the cross section of the exhaust-gas flow is, as a result, more uniform.

The SCR catalytic converter arranged downstream of the injection nozzle is then supplied more uniformly with the aforementioned improved mix of exhaust gas and medium on its cross-sectional area viewed in the flow direction, with the enriched exhaust-gas mixture and thus it is fully utilized.

As a result of the improved mixing with exhaust gas, faster vaporizing of the reducing agent results. Primarily in connection with the SCR catalytic converter, an effective uniform supply of exhaust-gas displaced by reducing agent takes place, therefore, over the entire cross section of the catalytic converter. The functioning of the catalytic converter is thereby markedly improved and/or more efficient.

The swirl element may be oriented at least approximately perpendicular to the central longitudinal axis of the exhaust-gas pipe. Such a swirl element may be fitted and/or fastened at that point in a particularly simple and stable manner in an exhaust-gas pipe, namely transversely thereto. The efficiency of the swirl element is thus dictated by its shape, for example the cross-sectional shape relative to the exhaust-gas flowing in and its distance from the point of injection of the reducing agent. The term "efficiency" is understood in this case to be how far the swirl element improves the mixing of the reducing agent with the exhaust gas relative to a situation without the swirl element.

The swirl element may have a central longitudinal axis and a cross section which is round relative to said central longitudinal axis. As a result of the shape of the round cross section, for example elliptical or circular, different degrees of swirling of the exhaust-gas may be achieved. The cross-sectional shape may thus, for example, be adapted to the exhaust-gas velocity, the cross-sectional area of the exhaust-gas pipe, etc.

The swirl element may be substantially cylindrical relative to a central longitudinal axis, i.e. may have a circular cross section. Such swirl elements may be produced particularly easily and cost-effectively.

The swirl element may be hollow inside, i.e. for example tubular. This involves a considerable weight saving relative to a solid swirl element, the swirling of the exhaust gas being unaltered.

The swirl element may be arranged centrally in the exhaust-gas pipe. For example, with a cylindrical swirl element, this means that the central longitudinal axis thereof intersects the central longitudinal axis of the exhaust-gas pipe. As a result, a uniform and/or symmetrical swirling in the generally symmetrical exhaust-gas pipe is achieved in the flow shadow of the swirl element. It is, however, also conceivable to select an off-center position of the swirl element. This is expedient when in the exhaust pipe the exhaust-gas flows asymmetrically at the position of the swirl element. This may, for example, be provided by a curvature of the exhaust gas pipe located directly upstream of the swirl element.

The swirling is particularly efficient and thus the mixing of the exhaust gas with the reducing agent, when the direction of injection of the injection nozzle and thus of the reducing agent are located in one plane with the central longitudinal axis of the swirl element and the central longitudinal axis of the exhaust-gas pipe. As a result, a highly symmetrical arrangement is produced which ensures a particularly uniform swirling of the exhaust gas, precisely in the region for injecting the reducing agent.

The direction of injection of the injection nozzle and thus the preferred direction of the injected reducing agent may be oriented at an angle $\alpha$ to the central longitudinal axis of the exhaust-gas pipe. The angle is selected in this case, such that the reducing agent is injected obliquely into the exhaust-gas flow. The direction of injection is thus also obliquely inclined relative to the cross-sectional plane of the exhaust-gas pipe downstream, i.e. the direction of movement of the injected reducing agent has velocity components which are transverse to, and in the flow direction of, the exhaust-gas. This improves the mixing of the reducing agent and exhaust-gas relative to an injection perpendicular or parallel to the central longitudinal axis of the exhaust-gas pipe and thus the main flow direction of the exhaust-gas.

The injection region of the injection nozzle and thus the reducing agent may be located in the flow shadow of the swirl element. In particular in the flow shadow of the swirl element, the exhaust-gas flow generally has a turbulent flow behavior which further promotes the particularly homogenous mixing of the reducing agent with the exhaust-gas flow.

An accurate adjustment of the position of the swirl element with the injection position and the injection angle of the reducing agent is carried out, for example, as a result of experiment or by simulation.

It is irrelevant how the swirl element is fitted in the exhaust-gas pipe. During manufacture, it may, for example, be manufactured integrally with the exhaust-gas pipe, retrospectively fitted, welded-on or the like.

Other features which are considered as characteristic for the invention are set forth in the appended claims.

Although the invention is illustrated and described herein as embodied in exhaust-gas system having an injection nozzle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
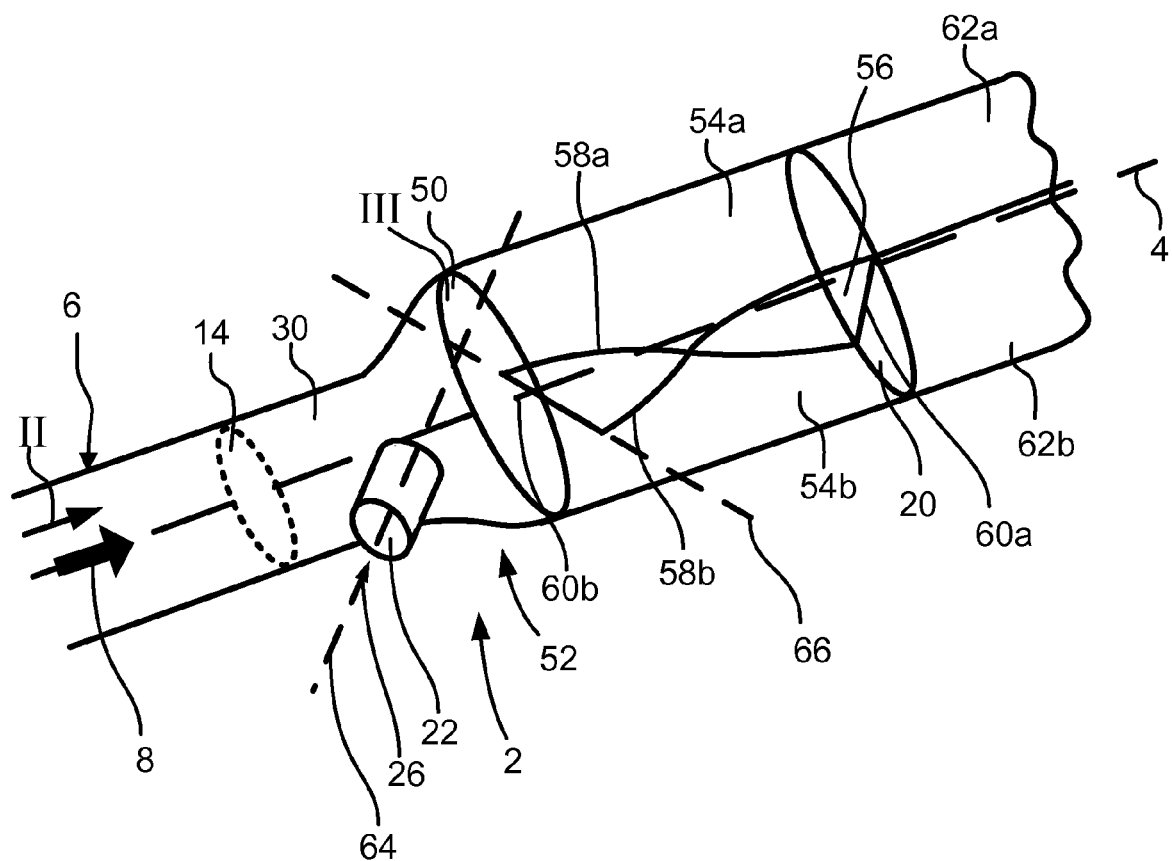
FIG. 1 is a schematic diagram of an exhaust-gas pipe during the injection of a reducing agent, with the distribution among two exhaust-gas lines and a fluid divider.

Referring now to the figures of the drawing in detail and first, particularly, to FIGS. 1 and 2, there is shown an exhaust-gas pipe 2 which, on its face 6 facing the (non-illustrated) internal combustion engine has, for example, a circular cross section but on the face 12, facing towards a catalytic converter described below, an oval cross section 50. FIG. 2 shows, in the viewing direction II, the plan view of FIG. 1 in the flow direction of the exhaust gas (arrow 8).

In the flow direction of the exhaust gas, the exhaust-gas pipe 2 is divided in the region 52 into two exhaust-gas lines 54a and 54b. In the region 52, as described below in more detail, reducing agent is injected via a nozzle 22 in the direction of the arrow 26 into the interior 30 of the exhaust-gas pipe 2. The catalytic converter is, in this case, formed by two partial catalytic converters 62a,b, respectively one in each exhaust-gas line 54a,b. The catalytic converters are typically located, however, further downstream than is shown in FIG. 1 for reasons of clarity.

Downstream of the region 52, an approximately strip-shaped fluid divider 56 is arranged which separates the exhaust-gas pipe 2 into the two exhaust-gas lines 54a,b. To this end, the fluid divider 56 is attached by both its longitudinal faces 58a,b to the wall 20 of the exhaust-gas pipe 2 and by its downstream front face 60a fastened to the abutting edge of the two partial catalytic converters 62a,b. The front face 60a thus extends in the cross-sectional plane of the exhaust-gas pipe 2.

The upstream front face 60b of the fluid divider 56, however, is rotated relative to the front face 60a with regard to the central longitudinal axis 4 but also perpendicular thereto. The fluid divider thus forms a twisted strip relative to the central longitudinal axis 4.

The front face 60b is located, therefore, on a straight line 66 which together with the central longitudinal axis 4 and the straight lines 64 predetermined by the direction of injection of the reducing agent in the direction of the arrow 26, is arranged in one plane, the straight line 64 and the straight line 66 intersecting one another.

It may be seen in FIG. 2 that the straight lines 64 and 66 are congruent in the viewing direction of the exhaust-gas flow. Moreover, the tilting and/or rotation of the front faces 60a and 60b relative to one another may be seen.

Figure 2:
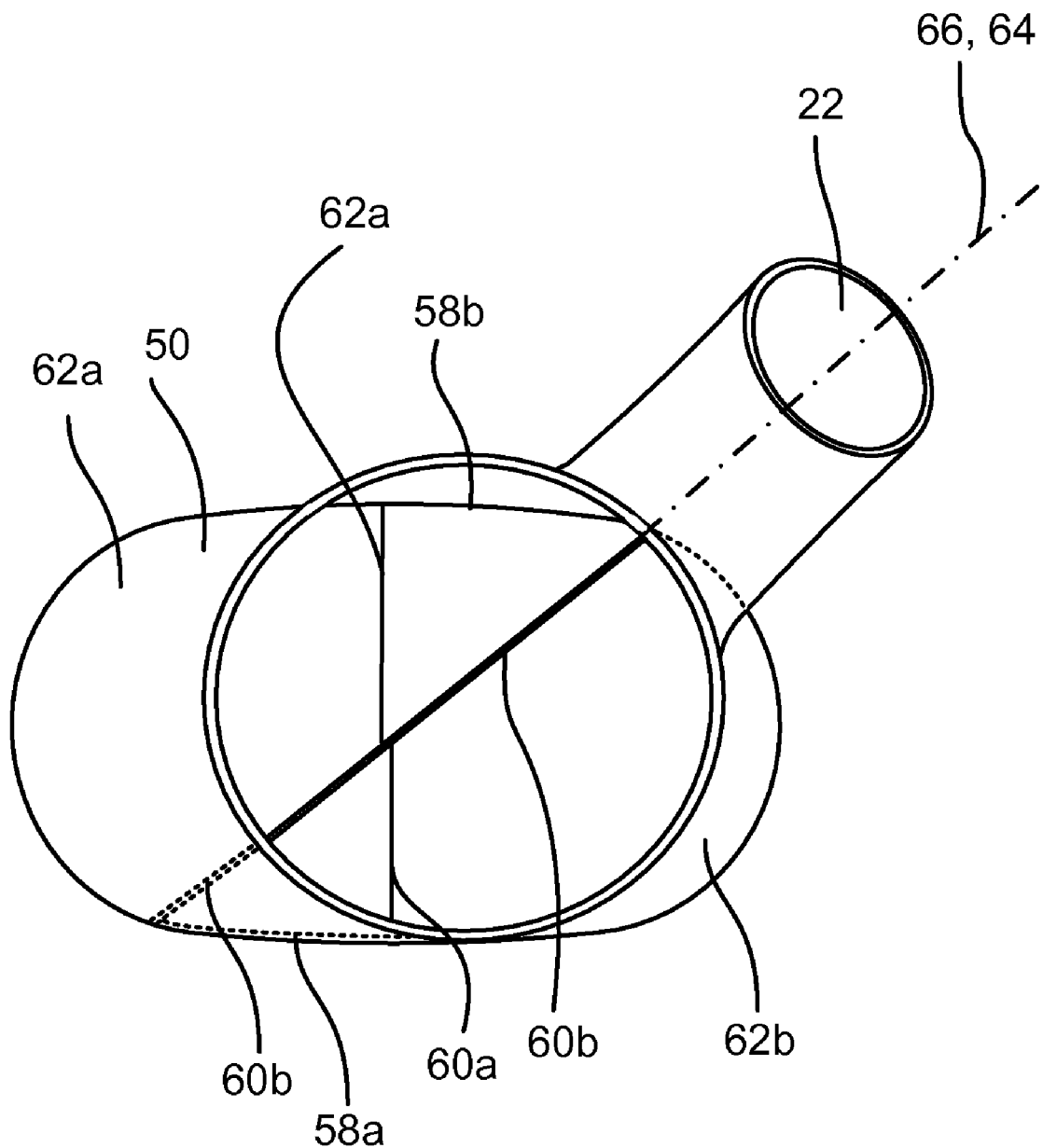
FIG. 2 is an end view of the assembly of FIG. 1, viewed in the direction II.
Figure 3:
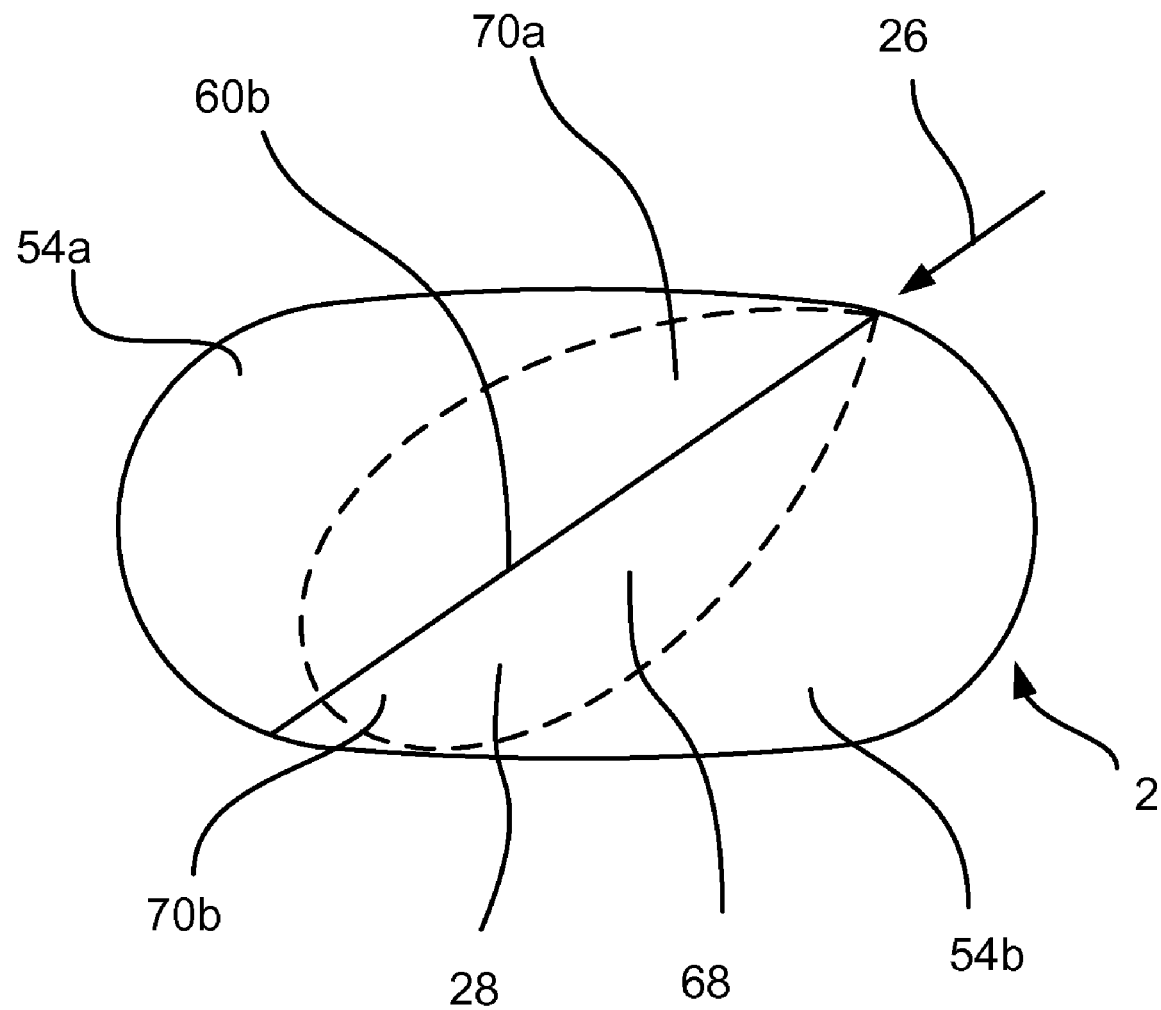
FIG. 3 is a section taken along the line III in FIG. 1.

FIG. 3 shows a section through the configuration of FIG. 1 along the face III, i.e. transversely to the flow direction of the exhaust gas. Here it may be seen how, in the direction of the arrow 26, the reducing agent 28 injected into the exhaust-gas pipe 2 forms an atomizing cone 68 which is divided by the front face 60b of the fluid divider 56 into portions 70a,b of identical surface area. As the front face 60b and/or the fluid divider 56 in its entirety separates the exhaust-gas lines 54a,b from one another, approximately the same quantities of reducing agent 28 reach the two exhaust-gas lines 54a,b and thus the partial catalytic converters 62a,b.

The division takes place in an alternative embodiment, not shown, where the surface areas do not have to be identical. The atomizing cone 68, according to the orientation and/or position of the front face 60b of the fluid divider 56, may also be divided relative to the cross section 50 in any other ratios.

Figure 4:
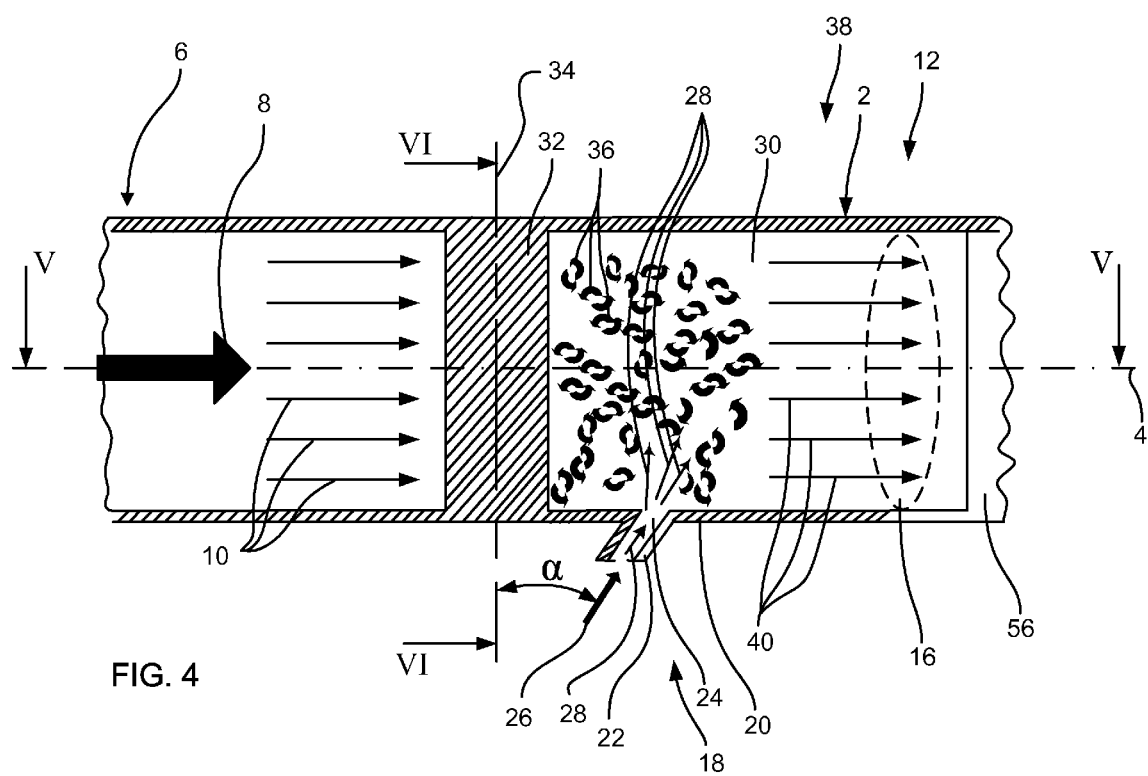
FIG. 4 is a longitudinal section through an exhaust-gas pipe comprising a swirl element, during the injection of a reducing agent.
Figure 5:
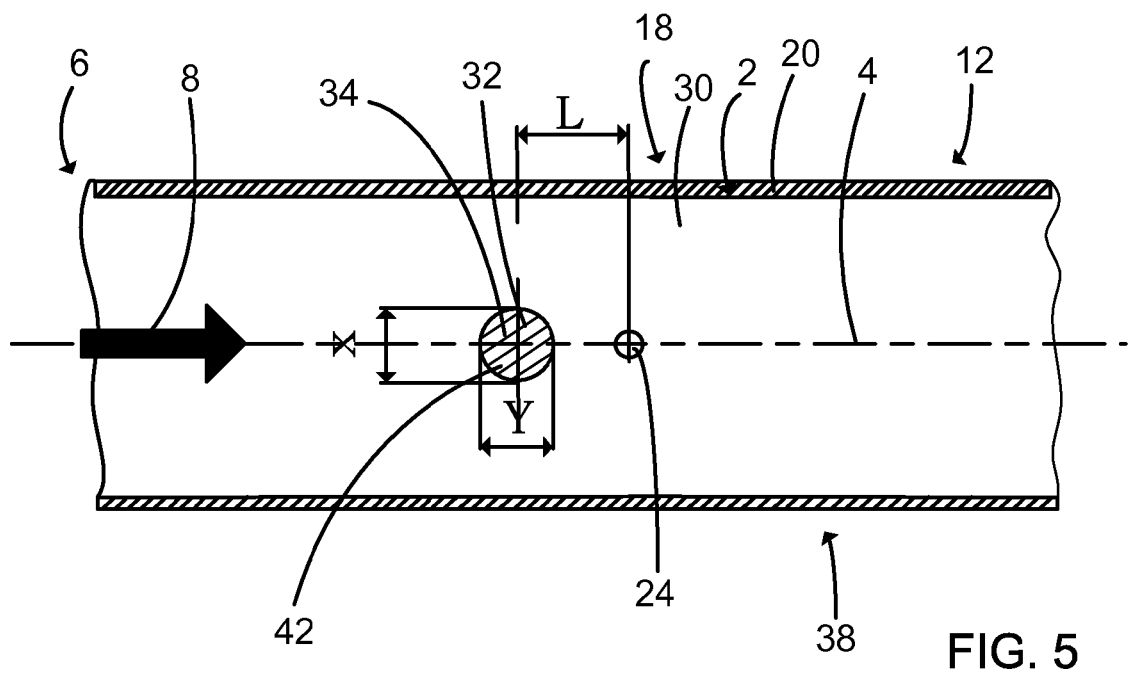
FIG. 5 is a section taken along the line V-V in FIG. 4.

FIG. 4 shows a portion of the exhaust-gas pipe 2 located further upstream and centrally intersected in the longitudinal direction, which is of circular cylindrical configuration, for example, relative to its central longitudinal axis 4. FIGS. 5 and 6 show respectively sectional views through the exhaust-gas pipe 2 along the cutting lines V-V and VI-VI in FIG. 4.

On the face 6, the exhaust-gas pipe 2 is connected to the internal combustion engine, not shown, from which gaseous exhaust gas 10 flows during operation in the direction of the arrow 8 through the exhaust-gas pipe 2. The arrow 8 thus represents the flow direction of the exhaust gas 10. On the other face 12 of the exhaust-gas pipe 2, said exhaust-gas pipe opens into the fluid divider 56.

In the region 18 of the exhaust-gas pipe 2 upstream of the fluid divider 56, a nozzle 22 with a nozzle opening 24 is fitted in the wall 20 of the exhaust-gas pipe 2. Through the nozzle 22 in the region 18 in the direction of the arrow 26, reducing agent 28 (for example aqueous urea solution) is injected into the interior 30 of the exhaust-gas pipe 2. The reducing agent 28 is, in this case, firstly liquid, then vaporizes in the hot exhaust-gas 10 and is mixed therewith. The direction of injection of the reducing agent 28 has a component in the flow direction of the exhaust-gas 10.

Upstream of the region 18, in the interior 30 of the exhaust-gas pipe 2, a swirl cylinder 32 is arranged, i.e. connected to the wall 20 of the exhaust-gas pipe 2 in a gastight manner. The central longitudinal axis 34 of the swirl cylinder 32 thus intersects the central longitudinal axis 4 perpendicularly, i.e. the swirl cylinder 32 is arranged centrally in the exhaust-gas pipe 2. Naturally, depending on the situation, an off-center arrangement is also conceivable. The swirl cylinder 32 fills the internal cross section 16 of the exhaust-gas pipe 2 only partially, so that the exhaust-gas 10 may flow past said internal cross section. By means of the swirl cylinder 32, the exhaust-gas 10 is swirled in the region 18, i.e. the downstream flow shadow thereof. This is illustrated in FIG. 4 by the arrows 36.

As this swirling takes place in the region 18 where the nozzle opening 24 is also arranged, the liquid and/or gaseous reducing agent 28 is mixed by swirling along the arrows 36 with the exhaust-gas 10. As a result, it is achieved that in the region 38, i.e. downstream of the region 18 and upstream of the catalytic converter 62a,b and/or fluid divider 58, a gas flow 40 is produced which consists of exhaust-gas 10 enriched with reducing agent 28, the distribution of the concentration of the reducing agent 28 being almost uniform over the internal cross section 16 of the exhaust-gas pipe 2, which results in faster vaporizing in the swirling area.

The direction of injection of the reducing agent 28 in the direction of the arrow 26 is located in one plane with the central longitudinal axis 34 and the central longitudinal axis 4, and is tilted relative to the central longitudinal axis 34 by the angle α in the flow direction of the exhaust-gas 10, i.e. in the direction of the arrow 8.

FIG. 5 shows that the swirl cylinder 32 is arranged at the distance L upstream of the nozzle opening 24. As the swirl cylinder 32 has a circular cross section 42, the dimensions X and Y thereof are identical transversely to and in the direction of the central longitudinal axis 4. As a result of, for example, an elliptical shape, not shown, of the swirl cylinder 32 in cross section 42, i.e. different dimensions X and Y and variations in the length L, the swirling of the exhaust-gas 10 in the region 18 may be influenced. The geometries may be adapted to the cross section 16 and/or diameter D of the exhaust-gas pipe 2, such that the swirling according to the arrows 36 is sufficient to achieve the aforementioned uniform distribution of the concentration of the reducing agent 28 over the cross section 16.

Figure 6:
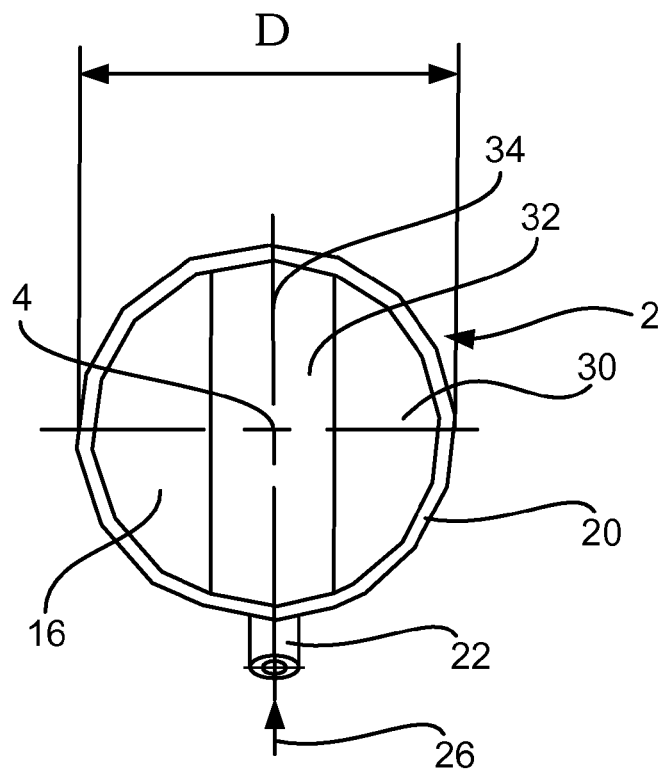
FIG. 6 is a section taken along the line VI-VI in FIG. 4.

FIG. 6 also shows how, in the viewing direction of the exhaust-gas flow, the swirl cylinder 32 relative to its central longitudinal axis 34 is aligned with the inflow direction of the reducing agent 28, i.e. the arrow 26. The reducing agent 28 is thus centrally sprayed into the interior 30 of the exhaust-gas pipe 2 in the flow shadow of the swirl cylinder 32.

The invention claimed is:

1. An exhaust-gas system, comprising:
an exhaust-gas pipe for guiding an exhaust-gas flow;
an injection nozzle mounted to said exhaust-gas pipe for injecting a reducing agent into the exhaust-gas flow, said injection nozzle being configured to inject the reducing agent into the exhaust gas flow in form of an atomizing cone;
an exhaust-gas pipe branching device downstream of said injection nozzle, dividing said exhaust-gas pipe into at least two exhaust-gas lines;
a separate SCR catalytic converter disposed in each one of said exhaust-gas lines;
a fluid divider disposed between said injection nozzle and said branching device, said fluid divider having a front face facing upstream into the exhaust-gas flow and intersecting a projection of said atomizing cone on a cross-sectional area of said exhaust gas pipe and the front face being oriented with respect to the cross-sectional area of the exhaust-gas pipe to divide the exhaust-gas flow and the reducing agent between said at least two exhaust-gas lines in a predefinable dividing ratio.

2. The exhaust-gas system according to claim 1, wherein said front face of said fluid divider is oriented to uniformly divide the reducing agent between said exhaust-gas lines.

3. The exhaust-gas system according to claim 1, wherein said front face includes one or more straight pieces.

4. The exhaust-gas system according to claim 1, wherein said fluid divider is configured as a strip twisted along a longitudinal axis of said exhaust-gas pipe.

5. The exhaust-gas system according to claim 1, wherein said front face of said fluid divider is located in one plane with a central longitudinal axis of said exhaust-gas pipe and said injection device for the reducing agent.

6. The exhaust-gas system according to claim 1, which comprises a swirl element disposed upstream of said injection nozzle in said exhaust gas pipe for swirling the exhaust-gas flow in an injection region for injecting the reducing agent.

7. The exhaust-gas system according to claim 6, wherein said swirl element is oriented substantially perpendicular to a central longitudinal axis of said exhaust-gas pipe.

8. The exhaust-gas system according to claim 6, wherein said swirl element has a central longitudinal axis and a round cross section relative to said central longitudinal axis.

9. The exhaust-gas system according to claim 8, wherein said swirl element is cylindrical.

10. The exhaust-gas system according to claim 6, wherein said swirl element is a hollow structure.

11. The exhaust-gas system according to claim 6, wherein said swirl element is disposed centrally in said exhaust-gas pipe.

12. The exhaust-gas system according to claim 6, wherein a direction of injection of said injection nozzle is disposed in one plane with a central longitudinal axis of said exhaust-gas pipe and a central longitudinal axis of said swirl element.

13. The exhaust-gas system according to claim 1, wherein said injection nozzle is oriented such that a direction of injection points downstream and is inclined with a given angle to a central longitudinal axis of said exhaust-gas pipe with respect to the exhaust-gas flow.

14. The exhaust-gas system according to claim 6, wherein said injection nozzle is disposed to form an injection region in the exhaust-gas flow in a flow shadow of said swirl element.

* * * * *